(No Model.) 2 Sheets—Sheet 1.
R. D. O. JOHNSON.
ROCK DRILL.
No. 560,801. Patented May 26, 1896.
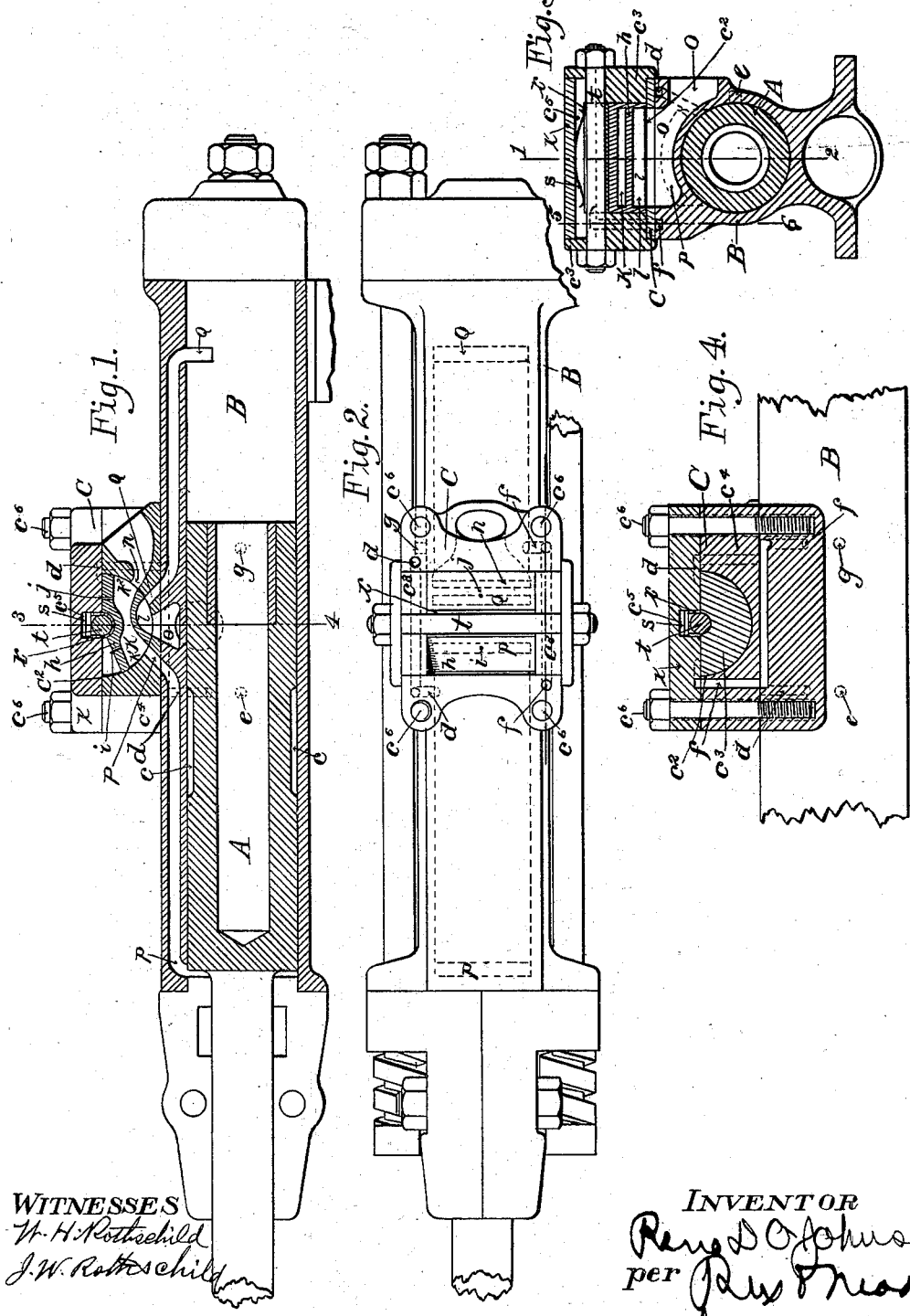
WITNESSES
INVENTOR
Attorneys (No Model.)  
R. D. O. JOHNSON.  
ROCK DRILL.

No. 560,801.  
2 Sheets—Sheet 2.  
Patented May 26, 1896.

WITNESSES  
W. H. Rothschild  
J. W. Rothschild

INVENTOR  
Reno D. O. Johnson  
per Rice & Moody  
his ATTORNEYS

UNITED STATES PATENT OFFICE.

RENO D. O. JOHNSON, OF ISABELLA, MISSOURI.

ROCK-DRILL.

SPECIFICATION forming part of Letters Patent No. 560,801, dated May 26, 1896.

Application filed May 13, 1895. Serial No. 549,175. (No model.)

*To all whom it may concern:*

Be it known that I, RENO D. O. JOHNSON, a citizen of the United States, residing at Isabella, in Ozark county, Missouri, have invented a new and useful Improvement in Rock-Drills, of which the following is a specification.

My invention relates to rock-drills driven by either compressed air or steam, and has for its chief objects, first, to provide wide and direct ports; second, to reduce the movement of the valve, and diminish wear and repairs as much as possible; third, to cause the valve to wear to its seat and diminish leakage; fourth, to provide a device in which the valve may be either balanced or caused to press upon its seat by simply changing the proportions of parts; fifth, to lower the height of the valve-chest, and, sixth, to cheapen the cost of manufacture. I attain these objects by the mechanism illustrated in the accompanying drawings, in which—

Figure 5:
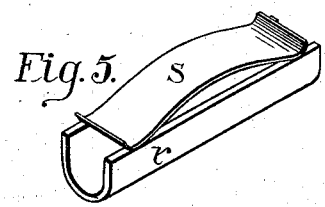
Figure 6:
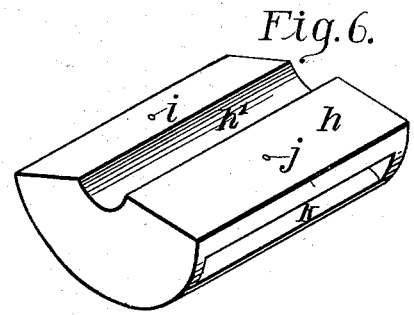
Figure 7:
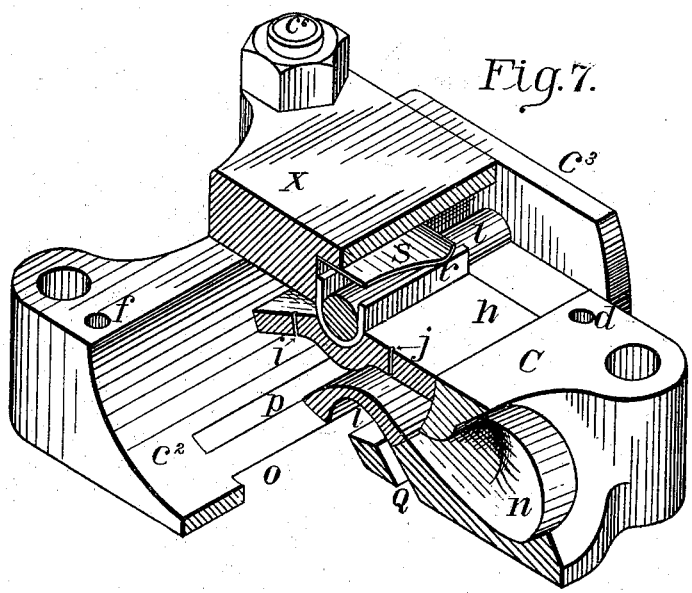

Figure 1 is a vertical longitudinal section along the line 1 2, Fig. 3. Fig. 2 is a plan view with the valve-chest cap removed. Fig. 3 is a vertical cross-section along the line 3 4, Fig. 1. Fig. 4 is a vertical longitudinal section along the line 5 6, Fig. 3. Fig. 5 is an isometric projection of a detail. Fig. 6 is an isometric projection of the valve. Fig. 7 is an isometric projection of a partial section of the valve-chest along the line 1 2, Fig. 3, and the line 3 4, Fig. 1, showing portions of the valve-chest, valve, and valve-chest cap.

Similar letters refer to similar parts throughout the several views.

A, Figs. 1 and 3, represents a piston, and B, Figs. 1, 2, 3, and 4, a cylinder within which it reciprocates. The piston A is of ordinary construction, except that an annular groove $c$ is formed therein at about the center. The valve-chest C is preferably formed in four pieces, viz: a central piece $c^4$, in which a valve-seat $c^2$, preferably semicylindrical, is formed; heads $c^3$ $c^3$, preferably held in position by a bolt $t$, and a cap $x$, preferably having the transverse groove $c^5$ formed in its under side, and preferably held in place by bolts $c^6$ $c^6$, &c., which also, in the construction shown, serve the purpose of attaching the entire valve-chest to the cylinder B.

$n$, Figs. 1, 2, and 7, is a passage for the admission of steam or compressed air to the valve-chest.

O, Figs. 1, 3, and 7, is an exhaust-port. P, Figs. 1, 2, and 7, is a cylinder-port opening into the valve-chest on one side of the port O; and Q, Figs. 1, 2, and 7, is a cylinder-port opening into the valve-chest on the opposite side of the exhaust-port.

$d$ is a valve exhaust-port connecting the back of the valve-chest with the interior of the cylinder B.

$e$ is a hole through the cylinder, connected with the port $d$ by the groove $c$ when the parts are in the positions in which they are represented.

$f$ is a valve exhaust-port connecting the side of the back of the valve-chest opposite the side with which the port $d$ connects with the interior of the cylinder. It is connected with the hole $g$ through the cylinder when the groove $c$ arrives opposite $g$.

$h$, Figs. 1, 2, 3, 6, and 7, is an oscillating valve in the shape of a segment of a right circular cylinder, and adapted to seat in the seat $c^2$ of the valve-chest C. $h'$ is a longitudinal groove in the valve $h$.

$r$, Figs. 1, 2, 3, 4, 5, and 7, is a U-shaped spring-packing fitting around the bolt $t$, and whose upper edges rest within the groove $c^5$ in the cap-plate $x$. Its bottom rests within the groove $h'$ in the valve $h$, which oscillates upon it.

$s$ is a spring resting within the groove $c^5$ and pressing the packing $r$ into contact with the valve $h$, and also tending to keep the valve $h$ pressed against its seat.

$k$, Figs. 1, 3, 6, and 7, is an opening through the valve $h$ for the passage of steam or air to the cylinder-ports. It preferably extends nearly but not quite to the ends of the valve $h$, which are preferably left solid. The mouths $k'$ and $k^2$ of the opening $k$ are preferably of the same size, so as to make the valve reversible end for end. The width of the mouths is such that within the limits of the movement of the valve the mouth next the steam-inlet $n$ always remains open to it. When the valve $h$ is in the position shown, the passage $k$ connects the inlet $n$ and the port P. When the valve oscillates into its opposite position, it connects $n$ with the cylinder-port Q. The small steam-passage $i$ through one side of the valve connects the passage $k$ with the exhaust-port $f$, and the similar passage $k$ $j$ through the opposite side connects the passage $k$ with the port $d$. Both the passages $i$ and $j$ are preferably considerably smaller than the valve exhaust-ports with which they respectively connect.

$l$, Figs. 1, 3, and 7, is an opening through the valve $h$, preferably of the same length as the opening $k$. In the position in which the valve $h$ is shown it connects the cylinder-port Q with the exhaust-port O. In the opposite position of the valve the passage $l$ connects the port P with the exhaust O.

The valve and valve-chest described may be made very cheaply. The bodies of two chests may be cast together and the casting subsequently divided with a slitting-saw or other suitable tool and the two bodies bored out at one operation. In like manner two of the valves may be cast together and the casting divided. As will be observed, the main ports are wide and direct. The forms of the valve-chest and valve enable the chest to be made very low.

When the valve is proportioned as represented in the drawings, it is held to its seat by the steam or air pressure. The pressure may be decreased or, if desired, the valve balanced by increasing the combined areas of the mouths $k'$ and $k^2$ with relation to the opening $l$. I prefer a slight pressure on the valve-seat. The valve movement is very small, and as the valve wears to its seat it is not liable to leak or get out of order in any way.

The parts being in the positions in which they are represented, my improvement operates as follows: Steam, supposing it to be used, enters the opening $k$ in the valve $h$ through the passage $n$. The port $d$ being connected with the outer air by the groove $c$ and hole $e$ in the cylinder, steam passing through the opening $j$ in the valve passes freely to the outer air, thus relieving the back of that side of the valve from pressure, while steam passing through the opening $i$ on the other side of the valve cannot escape and brings the pressure behind that side of the valve up to substantially the same point as in the passage $k$. The pressure back of the valve on that side therefore overbalances the pressure on the other side and the valve is kept in the position shown. Steam above the piston is free to escape through the cylinder-port Q, valve-opening $l$, and exhaust-port O. Steam entering the cylinder B through the valve-opening $k$ and cylinder-port P forces the piston A toward the upper end of the cylinder. As soon as the groove $c$ of the piston passes the hole $e$ the exhaust-port $d$ is closed, and when said groove comes opposite the hole $g$ in the cylinder it connects it with the valve exhaust-port $f$ and permits steam therein to pass to the outer air. The back of the side of the valve having the opening $i$ being thus relieved from pressure, pressure within the opening $k$ causes the valve to oscillate into its opposite position, in which the steam-inlet $n$ is connected with the cylinder-port Q by the opening $k$ through the valve, while the valve-opening $l$ connects the cylinder-port P with the exhaust-port O. Steam then escapes from the lower end of the cylinder through the port P and enters the upper end through the port Q. The motion of the piston is thus reversed, and as it passes back toward its original position it first closes the valve exhaust-port $f$ and then opens the valve exhaust-port $d$, causing the valve $h$ to again reverse its position, and so on as long as steam is supplied.

I claim—

1. A valve-chest having a valve-seat in the shape of a right circular cylinder; a segmental oscillating valve, not exceeding a half-cylinder, seated on said seat; a space in said chest back of said valve; means dividing said space into two chambers, one back of one side of the valve and the other back of the other side; a valve exhaust-port connecting with each chamber; openings $k$ and $l$ through the valve; means alternately exhausting steam from each chamber back of the valve; an opening $i$ connecting the opening $k$ with the space back of the valve on one side, and an opening $j$ connecting the opening $k$, with the space back of the valve on the other side; substantially as described.

2. The combination of a valve-chest whose interior is semicylindrical; a valve in the shape of a segment of a right circular cylinder, less than a semicylinder, seated in said chest; means dividing the space back of said valve on one side, from the space back of it on the other; means holding said valve to its seat; openings $k$ and $l$ through the valve; an opening connecting the opening $k$ with a space back of the valve on one side; another opening connecting the opening $k$ with the space back of the valve on the other side; admission-port $n$; main exhaust-port O; and cylinder-ports P and Q; substantially as described.

3. The combination of a valve-chest connecting with a main exhaust-port O; valve exhaust-ports $d$ and $f$; admission-port $n$; and cylinder-ports P and Q; and containing a segmental oscillating valve, having openings $k$ and $l$; an opening $i$, connecting the opening $k$ with the back of the valve on one side; and the opening $j$, connecting the opening $k$ with the back of the valve on the other side; and means for preventing steam from passing back of the valve from one side to the other; substantially as described.

4. The combination of a valve-chest; ports $n$, $d$, $f$, O, P, and Q; the cylinder B, having the holes $e$ and $g$; the piston A, having the groove $c$; a segmental valve oscillating in the valve-chest, and having the openings $k$, $l$, $i$, and $j$; and means for preventing steam from passing, back of the valve, from one side to the other; substantially as described.

5. The combination of a valve-chest, having a groove in its cap-plate; a spring in said groove, forcing a steam-packing inward; a segmental valve oscillating on said steam-packing, and having openings $k$, $l$, $i$, and $j$; valve exhaust-ports $d$ and $f$; main exhaust-port O; admission-port $n$; cylinder-ports P and Q; a cylinder connected with said valve-chest by ports $d$, $f$, P, and Q, having the holes $e$ and $g$; and a piston having the groove $c$, and reciprocating in said cylinder; substantially as described.

6. The combination of the piston A, having the groove $c$; the cylinder B, having the holes $e$ and $g$; the valve-chest C, having the body $c^4$, the seat $c^2$, heads $c^3$ $c^3$, and the cap-plate $x$, having the groove $c^5$; the U-shaped spring-packing $r$, whose upper edges enter the groove $c^5$; a spring $s$ in said groove, tending to press the packing $r$ out of it; the valve $h$, oscillating on said packing $r$, and having the openings $i$ and $j$, $k$ and $l$; the valve exhaust-ports $d$ and $f$, connecting the back of the valve-chest with the interior of the cylinder; the exhaust-port O; and the cylinder-ports P and Q; substantially as described.

7. The combination of a valve-chest; a cap-plate, having a groove on its inner side; a spring in said groove; a steam-packing forced inward thereby; and a segmental oscillating valve seated in said chest, and against which said steam-packing is forced; substantially as described.

8. The combination of a segmental oscillating valve, provided with a main inlet-port, and auxiliary ports leading from the main inlet-port, with a valve-chest containing two chambers back of the valve, a cylinder, a piston reciprocating therein, and means controlled by the piston alternately exhausting the steam or compressed air from said chambers substantially as described.

Witness my hand this 11th day of May, 1895.

RENO D. O. JOHNSON.

Witnesses:
MARK MOODY,
BENJ. F. RAY.